US008897822B2

(12) United States Patent
Martin

(10) Patent No.: US 8,897,822 B2
(45) Date of Patent: Nov. 25, 2014

(54) AUTO RESPONDER

(75) Inventor: Brian Martin, Moraga, CA (US)

(73) Assignee: WaveMarket, Inc., Emeryville, CA (US)

( * ) Notice: Subject to any disclaimer, the term of this patent is extended or adjusted under 35 U.S.C. 154(b) by 250 days.

(21) Appl. No.: 13/470,323

(22) Filed: May 13, 2012

(65) Prior Publication Data

US 2013/0303106 A1 Nov. 14, 2013

(51) Int. Cl.
*H04W 4/00* (2009.01)

(52) U.S. Cl.
USPC ........ 455/466; 455/410; 455/412.1; 455/413; 455/415; 455/417; 455/569.2; 455/575.9

(58) Field of Classification Search
CPC .... H04M 1/64; H04M 1/72552; H04W 4/027
USPC ............... 455/41.2, 404.2, 456.1, 456.3, 466, 455/404.1, 410–420, 569.2, 575.9
See application file for complete search history.

(56) References Cited

U.S. PATENT DOCUMENTS

| | | | |
|---|---|---|---|
| 4,956,825 A | 9/1990 | Wilts et al. | |
| 5,882,258 A | 3/1999 | Kelly et al. | |
| 5,973,683 A | 10/1999 | Cragun et al. | |
| 6,690,940 B1 | 2/2004 | Brown et al. | |
| 7,106,843 B1 * | 9/2006 | Gainsboro et al. | 379/191 |
| 7,313,383 B2 * | 12/2007 | Fujii | 455/410 |
| 7,705,726 B2 | 4/2010 | Graves et al. | |
| 7,876,704 B1 | 1/2011 | Bims et al. | |
| 8,095,175 B2 | 1/2012 | Todd et al. | |
| 8,107,432 B2 | 1/2012 | Seo | |
| 8,225,413 B1 | 7/2012 | De et al. | |
| 8,249,627 B2 * | 8/2012 | Olincy et al. | 455/456.3 |
| 8,315,597 B2 * | 11/2012 | Olincy et al. | 455/410 |
| 8,351,408 B2 | 1/2013 | Daigle | |
| 8,369,838 B2 * | 2/2013 | Mallavarapu et al. | 455/412.2 |
| 8,503,994 B1 * | 8/2013 | Sanjeev | 455/414.1 |
| 8,594,065 B2 | 11/2013 | Polito et al. | |
| 8,768,286 B2 * | 7/2014 | Naboulsi | 455/345 |
| 2003/0211889 A1 | 11/2003 | Walker et al. | |
| 2003/0216138 A1 * | 11/2003 | Higuchi et al. | 455/412.1 |
| 2005/0003895 A1 | 1/2005 | Nara | |
| 2006/0270476 A1 | 11/2006 | Denkewicz | |
| 2007/0039624 A1 | 2/2007 | Roberts et al. | |
| 2008/0201441 A1 | 8/2008 | Bodic et al. | |

(Continued)

FOREIGN PATENT DOCUMENTS

FR 2863439 6/2005

OTHER PUBLICATIONS

Office Action dated Jan. 16, 2013 for U.S. Appl. No. 13/087,302.
U.S. Appl. No. 14/174,552, filed Feb. 6, 2014.

(Continued)

*Primary Examiner* — Sharad Rampuria
(74) *Attorney, Agent, or Firm* — Dovas Law, P.C.

(57) ABSTRACT

Mobile device auto responders that dynamically send customized automated messages that depend on the identity of an incoming call, on the location of the mobile device, on the speed of the mobile device, on the acceleration of the mobile device, and/or on the time of day. The automated message can be customized to include the location, speed, heading and/or acceleration of the mobile device as well as an estimated time of arrival over a predetermined stored route to a predetermined location. The automated message may be audio, video, email, iMessage™, instant message, or SMS message.

35 Claims, 6 Drawing Sheets

(56) References Cited

U.S. PATENT DOCUMENTS

| | | |
|---|---|---|
| 2009/0002147 A1 | 1/2009 | Bloebaum et al. |
| 2009/0017750 A1 | 1/2009 | Marcinkiewicz |
| 2009/0055938 A1 | 2/2009 | Samuel |
| 2009/0089876 A1 | 4/2009 | Finamore et al. |
| 2009/0181356 A1 | 7/2009 | Dasgupta |
| 2009/0204471 A1 | 8/2009 | Elenbaas et al. |
| 2009/0248436 A1 | 10/2009 | Takagi et al. |
| 2009/0271247 A1 | 10/2009 | Karelin et al. |
| 2009/0298019 A1 | 12/2009 | Rogan et al. |
| 2010/0028844 A1 | 2/2010 | Wiseman |
| 2010/0106573 A1 | 4/2010 | Gallagher et al. |
| 2010/0210254 A1 | 8/2010 | Kelly et al. |
| 2010/0279626 A1* | 11/2010 | Bradley et al. .................. 455/69 |
| 2010/0330543 A1 | 12/2010 | Black et al. |
| 2011/0047078 A1 | 2/2011 | Ginter et al. |
| 2011/0055546 A1 | 3/2011 | Klassen et al. |
| 2011/0093161 A1 | 4/2011 | Zhou et al. |
| 2011/0117878 A1* | 5/2011 | Barash et al. .............. 455/404.2 |
| 2011/0151830 A1 | 6/2011 | Blanda et al. |
| 2011/0275321 A1 | 11/2011 | Zhou et al. |
| 2011/0294520 A1 | 12/2011 | Zhou et al. |
| 2011/0296014 A1 | 12/2011 | Cancel et al. |
| 2011/0307434 A1 | 12/2011 | Rostampour et al. |
| 2012/0001548 A1 | 1/2012 | Recker et al. |
| 2012/0081500 A1 | 4/2012 | Border et al. |
| 2012/0083287 A1* | 4/2012 | Casto et al. ................ 455/456.1 |
| 2012/0110071 A1 | 5/2012 | Zhou et al. |
| 2012/0166285 A1 | 6/2012 | Shapiro et al. |
| 2012/0171990 A1 | 7/2012 | Williams et al. |
| 2012/0172100 A1 | 7/2012 | Colar et al. |
| 2012/0188163 A1 | 7/2012 | Xiao |
| 2012/0223861 A1 | 9/2012 | Kupfer et al. |
| 2012/0244883 A1 | 9/2012 | Tibbits et al. |
| 2012/0253918 A1 | 10/2012 | Marois |
| 2012/0315880 A1* | 12/2012 | Peitrow et al. ............. 455/412.1 |
| 2013/0054674 A1 | 2/2013 | Myers et al. |
| 2013/0111510 A1 | 5/2013 | Baker et al. |
| 2013/0143512 A1 | 6/2013 | Hernandez et al. |
| 2013/0143521 A1 | 6/2013 | Hernandez et al. |
| 2013/0185411 A1 | 7/2013 | Martin |
| 2013/0217331 A1* | 8/2013 | Manente ...................... 455/41.2 |
| 2013/0217363 A1 | 8/2013 | Myers |
| 2013/0303106 A1 | 11/2013 | Martin |
| 2013/0305384 A1 | 11/2013 | Weiss |

OTHER PUBLICATIONS

U.S. Appl. No. 14/250,777, filed Apr. 11, 2014.
U.S. Appl. No. 14/244,225, filed Apr. 3, 2014.
http://www.slideshare.net/mhoward6170/zoomsafer-how-it-works.

* cited by examiner

AUTO RESPONDER

FIELD OF INVENTION

This invention relates to mobile communication devices. More particularly, this invention relates to mobile communication devices having configurable and customizable auto responders.

BACKGROUND

Mobile devices such as cellular telephones, smart phones, GPS systems, and cellular-enabled personal computers have become very common and very powerful. This combination of ubiquity and capability has created an ongoing demand for even more capable devices and even more complex and enhanced applications.

Part of the power and capabilities of mobile devices are based on the existence of various infrastructures such as communication networks provided by mobile telephone operators. Such networks enable not only cellular communication links, but they also support "basic" services such as time keeping and access to the public telephone network. Other infrastructures include the United States Government operated global positioning system (GPS), which enables easily accessible position sensing, and ultra-accurate time signals that can be used by communication networks and mobile devices to synchronize signals and operations.

The power and capabilities of mobile devices are also based on using fast, powerful semiconductor devices such as very large scale integrated (VLSI) chips, their supporting components such as resistors, inductors, capacitors, and antennas, and software development and support tools. Such enable the development and use of powerful application software ("Apps") that can run on mobile devices to implement various features.

State-of-the-art mobile devices, sometimes referred to as smartphones, use the available infrastructures, devices, and software to implement a wide range of built-in features and capabilities. For example, communication ports, touch screen displays, keyboards, on/off sensors, compass orientation sensors, accelerometers, magnetometers, light sensors, proximity sensors, cameras, timers, microphones, audio outputs, memory card readers, internal memory, specialized software, GPS, and capabilities such as programmability, identifying cell towers, ascertaining cell tower signal strengths, identifying WiFi networks, and determining battery levels (strength).

Much of the capabilities of mobile devices are implemented using specialized software applications, referred to hereinafter as "apps" that extend the basic features of mobile devices. Apps are available to enhance telephone communications, electronic texting, data communications, social networking, calendars, alarms, memo and note recording, GPS navigation, location tracking, music (MP3) and video (MP4) playback, video calling, conference calling, movie playback, picture taking and sending, games, emails, audio and video downloading, internet access and browsing, specialized advertising, short range communications such as Bluetooth™, mobile banking, instant messaging and the ever-popular specialized ringtones.

The immense power, speed, and capabilities of mobile devices can at times become breathtaking. But, mobile devices have so much capability and power, they at times become so burdensome and intrusive that their use is legally restricted. For example, many states have implemented laws that restrict the use of mobile devices when driving. At other times a user may decide that the use of a mobile device is not warranted. For example, some drivers would rather not use a mobile device when driving, even if such is legal. At other times some users may not wish to be interrupted. However, most users would like to know who called even if they do not wish to actually answer a call.

To assist users in avoiding illegal driving activity related to mobile devices, and to assist other users from being distracted, a company, Location Labs, has developed a "Safe Driving" product for smart phones that automatically detects when a user is driving, and that automatically sets the mobile device into a "Driving Mode" which disables most texting and calling features, sends all incoming calls directly to voicemail, and hides text messages while driving. In emergencies, the "Driving Mode" can be overridden but, if overridden, a text message or an e-mail can be sent to a selected party (such as a parent). This "Safe Driving" product has proven itself to be a useful feature that enhances safety.

Some users may want to automatically "answer" an incoming call and send a message even if they cannot or will not personally handle the incoming call. The solution to the conflict of answering without answering is the auto responder.

An auto responder is a computerized system that automatically responds to incoming signals. Auto responders have proven themselves over the years to be very useful in automatically addressing problems with e-mails. For example, the rather basic automatically generated response from a service provider that an email could not be sent is one type of auto responder.

However, auto responders have proven themselves useful in other contexts such as automatically answering phones and responding with messages such as "X is not available and will return on Monday, please leave a message." Auto responders have also been used by marketers to leave automated messages while collecting phone numbers and the times of incoming calls. Later, pre-planned messages can be sent to the collected phone numbers.

While auto responders are known and have been used successfully, in the context of mobile devices the use of auto responders has been more limited. Mobile device auto responders that send "canned" messages in response to an incoming signal are known. For example, the foregoing Location Labs "Safe Driving" product when in "Driving Mode" can send an auto-response to alert an incoming caller that the call recipient is unavailable. However, enhanced mobile device auto responders that make use of the power of modern mobile devices would be useful.

SUMMARY

The invention relates to mobile device auto responders that dynamically send customized automated messages that depend on the identity of an incoming call, on the location of the mobile device, on the speed of the mobile device, on the acceleration of the mobile device, on the direction the mobile device is moving, on the type of call that is incoming (email, text, audio, instant messaging) and/or on the time of day. The automated message can be customized to include the location, speed, heading, and/or acceleration of the mobile device as well as an estimated time of arrival over a predetermined stored route to a predetermined location. Such a stored route may be learned. The automated message may be audio, email, iMessage™, another type of instant message, or an SMS message.

According to one aspect, the invention is a processor-implemented method for handling incoming communications to a mobile device. The method includes receiving an incoming communication from a caller to the mobile device and determining if use of the mobile device is restricted. The caller is identified to determine a caller identity, and a response message is automatically transmitted responsive to determining use of the mobile device is restricted and determining the caller identity.

According to one aspect, the invention is a processor-implemented method for handling incoming communications to a mobile device. The method includes receiving an incoming communication from a caller to the mobile device and determining if use of the mobile device is restricted. At least one of location, speed, acceleration and heading (compass orientation) of the mobile device is determined, and a response message is automatically transmitted to the caller responsive to determining use of the mobile device is restricted. The response message includes an indication of at least one of the location, heading, speed and the acceleration of the mobile device.

According to another aspect, the invention is a communication network having a mobile device with a processor, memory for storing information, a data port for receiving incoming calls and for sending messages, a GPS finder for determining the current location of the mobile device, a heading sensor for determining the direction the mobile device is moving, at least one I/O element for producing a human detectable output, and a clock for determining time. The memory, data port, GPS finder, I/O element, and clock are all operatively connected to the processor. Application software controls the processor to determine if the mobile device is moving. If moving, the application software causes the processor to automatically stop the I/O element from producing the human detectable output and is so programmed automatically prevents the driver from making any non-emergency calls. Then, upon the data port receiving an incoming call from a caller the application software controls the processor to identify the caller and then to automatically formulate a response message that depends on the identity of the caller. That automatically formulated response message is then automatically sent to the caller via the data port.

According to another aspect, the invention is a communication network having a mobile device with a processor, persistent memory for storing information, a data port for receiving incoming calls and for sending messages, a GPS finder for determining the current location of the mobile device, a method of determining the direction the mobile device is heading, at least one I/O element for producing a human detectable output, and a clock for determining time. The persistent memory, data port, GPS finder, I/O element, and clock are all operatively connected to the processor. Application software controls the processor to determine if the mobile device is moving. If moving, the application software causes the processor to automatically stop the I/O element from producing the human detectable output and if so programmed automatically prevents the driver from making any non-emergency calls. Then, upon the data port receiving an incoming call the application software controls the processor to determine the current location of the mobile device, and then to automatically formulate a response message that depends on the current location. That automatically formulated response message is then automatically sent to the caller via the data port.

In yet another aspect, the invention is a communication network having a mobile device with a processor, persistent memory for storing route and destination information, a data port for receiving incoming calls and for sending messages, a GPS finder for determining the current location of the mobile device, at least one I/O element for producing a human detectable output, and a clock for determining time. The persistent memory, data port, GPS finder, I/O element, and clock are all operatively connected to the processor. Application software causes the processor to determine the current location and current speed of the mobile device when the data port receives an incoming call. The application software than causes the processor to use the current location to determine route information to a destination. The application software further causes the processor to produce and estimated time of arrival at the destination. The application software then controls the processor to automatically formulate a response message that includes the estimated time of arrival and to automatically cause the data port to send the response message. The route information in the persistent memory can be learned over time or stored by the user.

BRIEF DESCRIPTION OF THE DRAWING(S)

The foregoing Summary as well as the following detailed description will be readily understood in conjunction with the appended drawings which illustrate embodiments of the invention. In the drawings.

DETAILED DESCRIPTION OF ILLUSTRATIVE EMBODIMENT(S)

The disclosed subject matter will now be described more fully hereinafter with reference to the accompanying drawings. It should be understood that this invention may take many different forms and thus the invention should not be construed as being limited to the specific embodiment set forth herein.

In the figures like numbers refer to like elements. Furthermore, the terms "a" and "an" as used herein do not denote a limitation of quantity, but rather denote the presence of at least one of the referenced items. All documents and references referred to herein are hereby incorporated by reference for all purposes.

Figure 1:
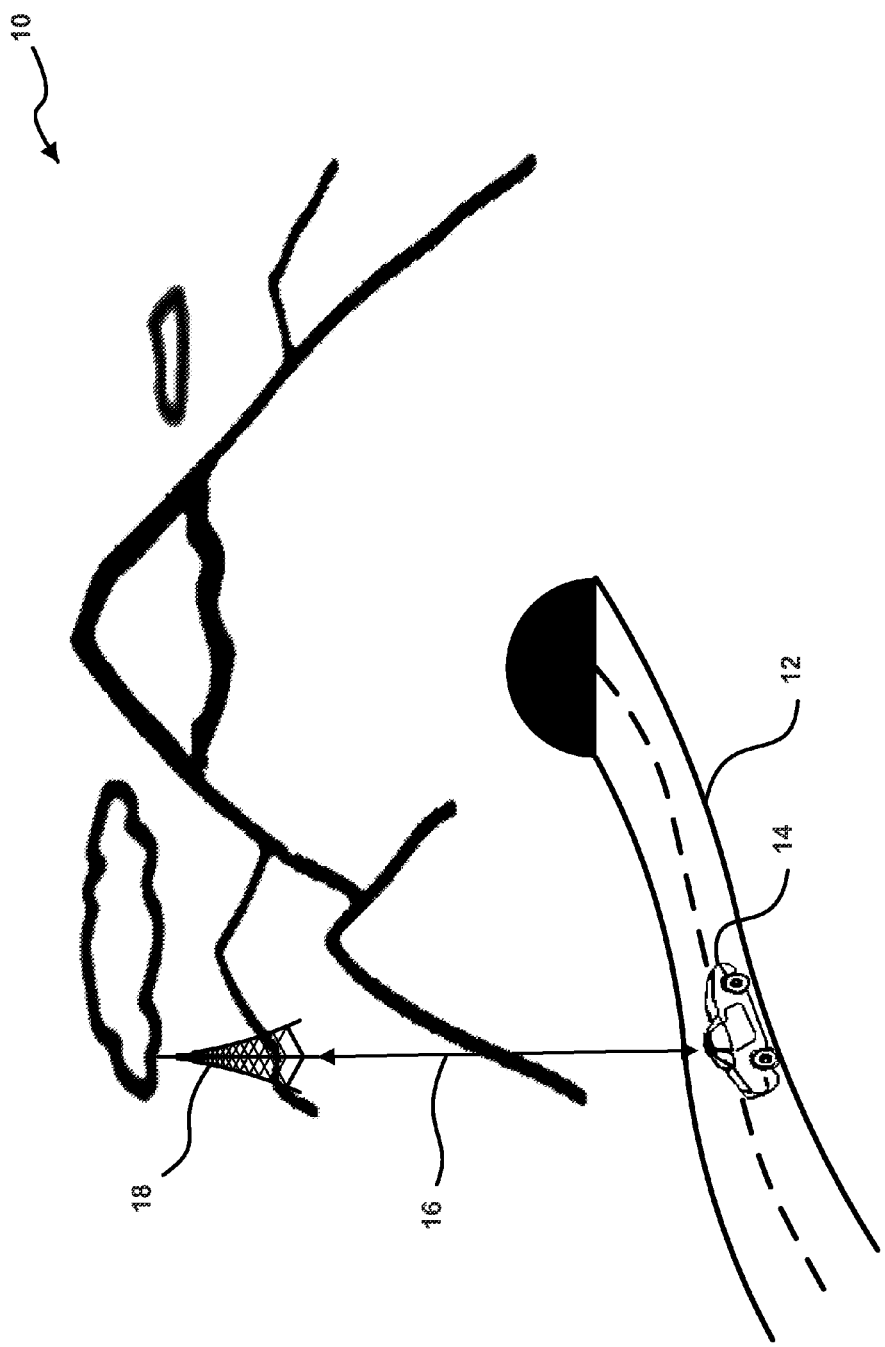
FIG. 1 is a depiction of a prototypical context in which the invention is practiced.

FIG. 1 illustrates a prototypical context 10 in which the invention is practiced. As shown the context 10 has a road that is part of a route 12 that is being traversed by a moving vehicle 14. That vehicle 14 is currently positioned at a specific location and is traveling at a certain speed along the route 12. As the vehicle 14 travels, its position, heading, and speed vary. A mobile device 116 (not shown, but see FIG. 2) is in the vehicle 14 and has established a communication path 16 using a cell tower 18 (which represents a communication server). The invention provides configurable auto responses to incoming calls received over the communication path 16.

Figure 2:
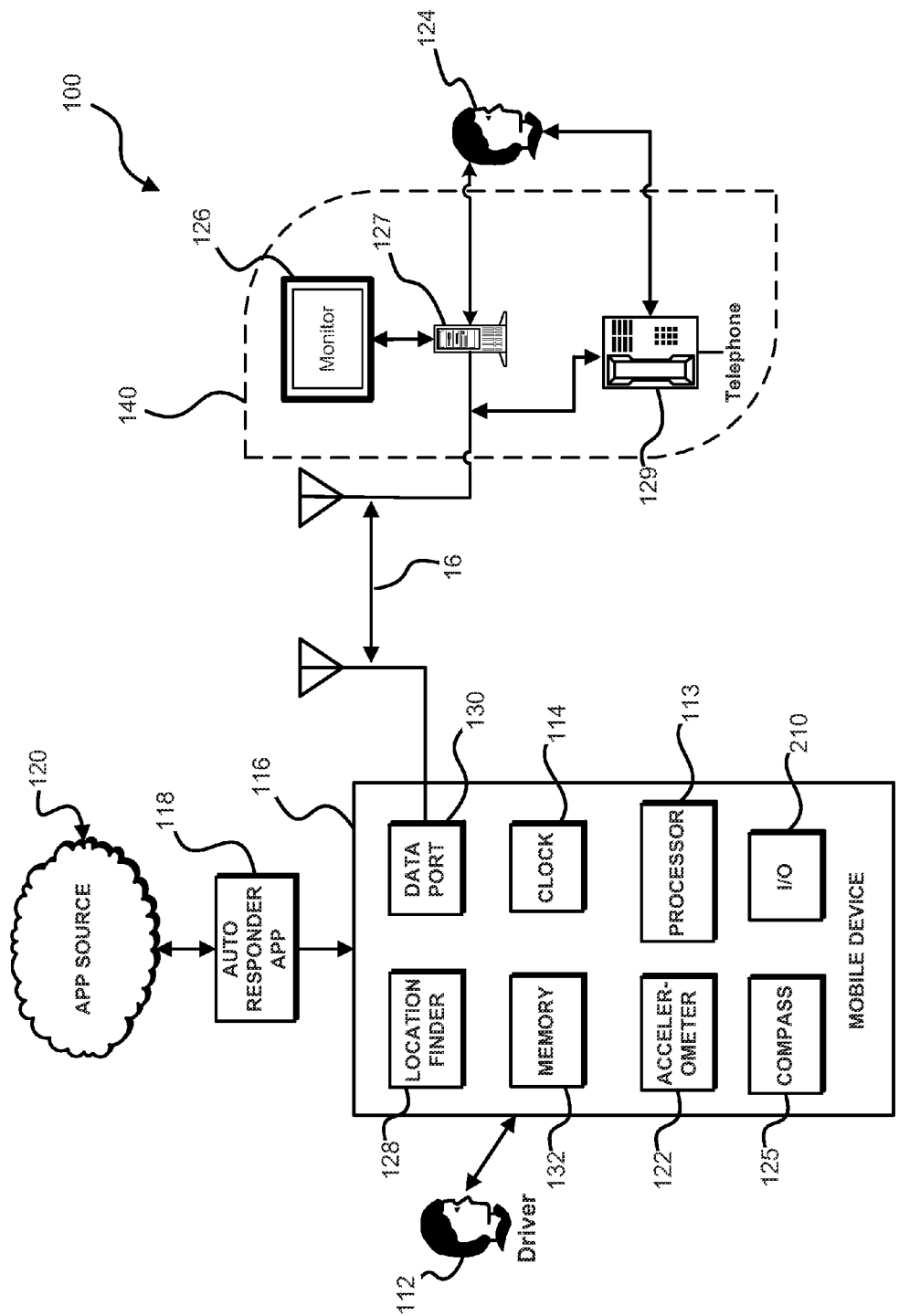
FIG. 2 illustrates a prototypical communication link for the context shown in FIG. 1.

FIG. 2 illustrates a prototypical communication link 100 that makes use of the invention. The communication link 100 includes a driver 112 driving the vehicle 14 (see FIG. 1) along the route 12 (again, see FIG. 1). The driver 112 carries the processor 113-based mobile device 116. The driver 112, or another party having access to the mobile device 116 such as a parent, has caused an auto responder app 118 to be downloaded from an app source 120. An example of the foregoing is a younger driver (the driver 112) who has been given a cell phone (the mobile device 116) by a parent who downloaded and installed the auto responder app 118 from a phone store (the app source 120) with the intent of improving driver safety by preventing incoming messages from disturbing the driver 112 and preventing the driver 112 from making any non-emergency outgoing calls while enabling automated and customized responses to incoming calls such that automated responses can send information such as location, speed, and estimated time of arrival.

Still referring to FIG. 2, the mobile device 116 includes a number of "built in" sensors and data sources that are accessible by the processor 113 in accord with the auto responder app 118. Typically these will include an accelerometer 122, a location finder 128 (e.g. a global positioning system ("GPS") finder), a clock 114, a data port 130, a compass 125 for producing direction information, and memory 132. The data port 130 supports communications between the mobile device 116 and a communication server (represented by the cell tower 18 of FIG. 1) over the communication path 16. Preferably the communication server enables the mobile device 116 to establish the communication path 16. Despite the seeming complexity of the mobile device 116, such devices are available at reasonable cost almost anywhere in the US and are sold by the tens of millions worldwide.

The communication link 100 also includes a caller 124 having a representative computerized communication system 140 that communicates over the communication path 16 with the driver 112. The communication system 140 is comprised of a telephone 129 for providing voice and SMS (short message service) communications, a computer 127 for supporting email and iMessage™ communications, and a monitor 126 that supports visual communications. Both the communication system 140 and the auto responder app 118 support voice, email, and SMS capabilities.

The mobile device 116 is capable of running a multitude of software applications and can be configured to enable a variety of features using a variety of settings and resources. The driver 112 can set up the mobile device 116 by adjusting sound levels, visual intensity levels, dates, times, timers, calendars, contact lists, contact groupings, speed dials, tools, and clock settings. In addition, the auto responder app 118 can automatically adjust features and settings and use any of the foregoing mentioned sensors as required to perform its programmed task(s). In particular, the auto responder app 118 can automatically prevent incoming call notifications, such as ring tones, vibrations, and display changes.

Still referring to FIG. 2, as noted the mobile device 116 includes sensors that provide information to the auto responder app 118. In particular, the auto responder app 118 can obtain and use GPS or other location information available from the location finder 128, accelerometer information from the accelerometer 122, compass heading information from the compass 125, and time information from the clock 114. It should be noted that location information can be used to determine not only location but also speed, heading, acceleration, and direction if the processor 113 is properly programmed.

Figure 3:
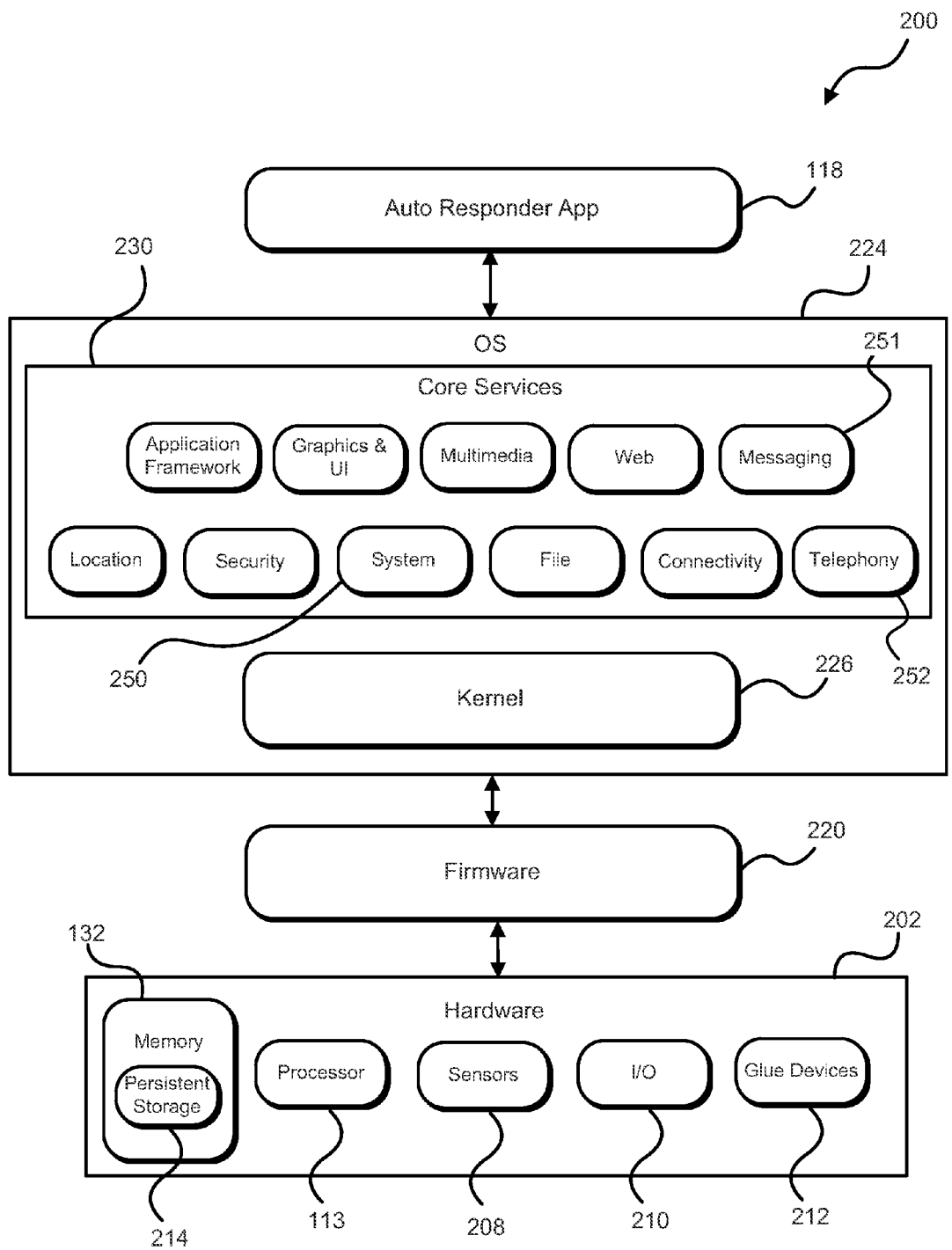
FIG. 3 illustrates the functional hierarchy of a mobile device practicing the invention.

FIG. 3 illustrates the functional hierarchy of the mobile device 116 when practicing the invention. At the lowest level are basic electronic hardware 202 devices. Such electronic hardware 202 includes the memory 132, the processor 113, numerous sensors 208, which includes the location finder 128, the accelerometer 122, and a time base which supports the clock 114, input/output ("I/O") devices 210 such as display screens and drivers, audio drivers and outputs, and RF transceivers that implement the data port 130, and various "glue" devices 212 required to change voltage levels or signal levels and to perform other interfacing as required for proper electronic hardware 202 functionally. The memory 132 includes persistent storage 214 whose purpose is described subsequently. The persistent storage 214 retains its stored information even when power is turned off.

Still referring to FIG. 3, the next level of hierarchical progression is firmware 220, if required. Firmware 220 is useful for assisting interfacing upper level systems with the electronic hardware 202, upgrading the mobile device 116, establishing a certain set of basic "start-up" and other functions, limiting or restricting the mobile device's capabilities, and storing non-volatile information, for example model number and revision number of the mobile device 116.

Moving up the hierarchical progression from the firmware 220 is an operating system (OS) 224. The operating system 224 provides a set of software programs that manage the electronic hardware 202 and firmware 220 and implement common services for a wide range of application software. The operating system 224 includes a low-level "kernel" routine 226 that handles software integration to the firmware 220 and electronic hardware 202 to implement underlying functionality. In practice the kernel 226 is seldom modified when used to form a family of mobile devices. However, different releases of operating systems may have different kernels 226. Over the kernel 226 is a set of core services 230 that, while basic, may change from time to time or from family device to family device. The core services 230 are software-based functions that support the on-board services of the mobile device 116. In the mobile device 116 those core services include system 250 software routines that support and enable obtaining GPS or other location information, accelerometer information, heading information, time information, and use of memory, as well as messaging routines 251 and telephony routines 252. The messaging routines 251 support voicemail, email, SMS service, iMessage™ and other instant messaging services, visual, and audio messaging while the telephony routines 252 support the data port 130.

Overlaying the operating system 224 is the auto responder app 118 whose operation is described in more detail subsequently.

The persistent storage 214 stores a wide range of permanent data in databases, specifically including position information. Such position information can be input by the driver 112, downloaded from a remote source, or learned over time. In particular, the position information includes destination information, such as the locations of the driver's home, office, and other locations that the driver 112 often goes to. The persistent storage 214 also stores route information, which includes routes the driver 112 commonly uses to go to the various destinations. For example, the route 12 shown in FIG. 1. Route information can be input by the driver 112, downloaded from a remote source such as MapQuest™ or Google Maps™, or learned over time. For example, if the route 12 is the path the driver 112 takes by leaving home, traveling South on Oak Street, turning onto I-5 traveling north, traveling 35 miles, exiting on Fern Street, traveling east 1 mile, and then turning into his office parking lot, route 12 can be learned by recording that travel.

In addition, the persistent storage 214 contains time information regarding the routes. For example, the persistent storage 214 records an average of 2 minutes to travel from the driver's home to the on-ramp of I-5, the average time it takes the driver 112 to travel each half-mile on I-5, and the average time it takes the driver 112 to travel from the off-ramp of I-5 to his office. The persistent storage 214 can therefore be used to estimate travel times between the driver's 112 home and his office, and along each half-mile of I-5.

The persistent storage 214 further includes time-of-day information. As is well-known to drivers in many urban areas, the time required to travel from point A to point B can be heavily dependent on the time-of-day. Driving 30 miles on I-5 starting at 3:00 AM might take 30 minutes while that same distance over the same route starting at 5:00 PM might take well over 2 hours. Thus the persistent storage 214 includes information to provide travel time estimates based on the time of day. For example, the times required to travel the same route at different times during a day can be stored or, equivalently, time-dependent correction factors can be stored.

Figure 4A:
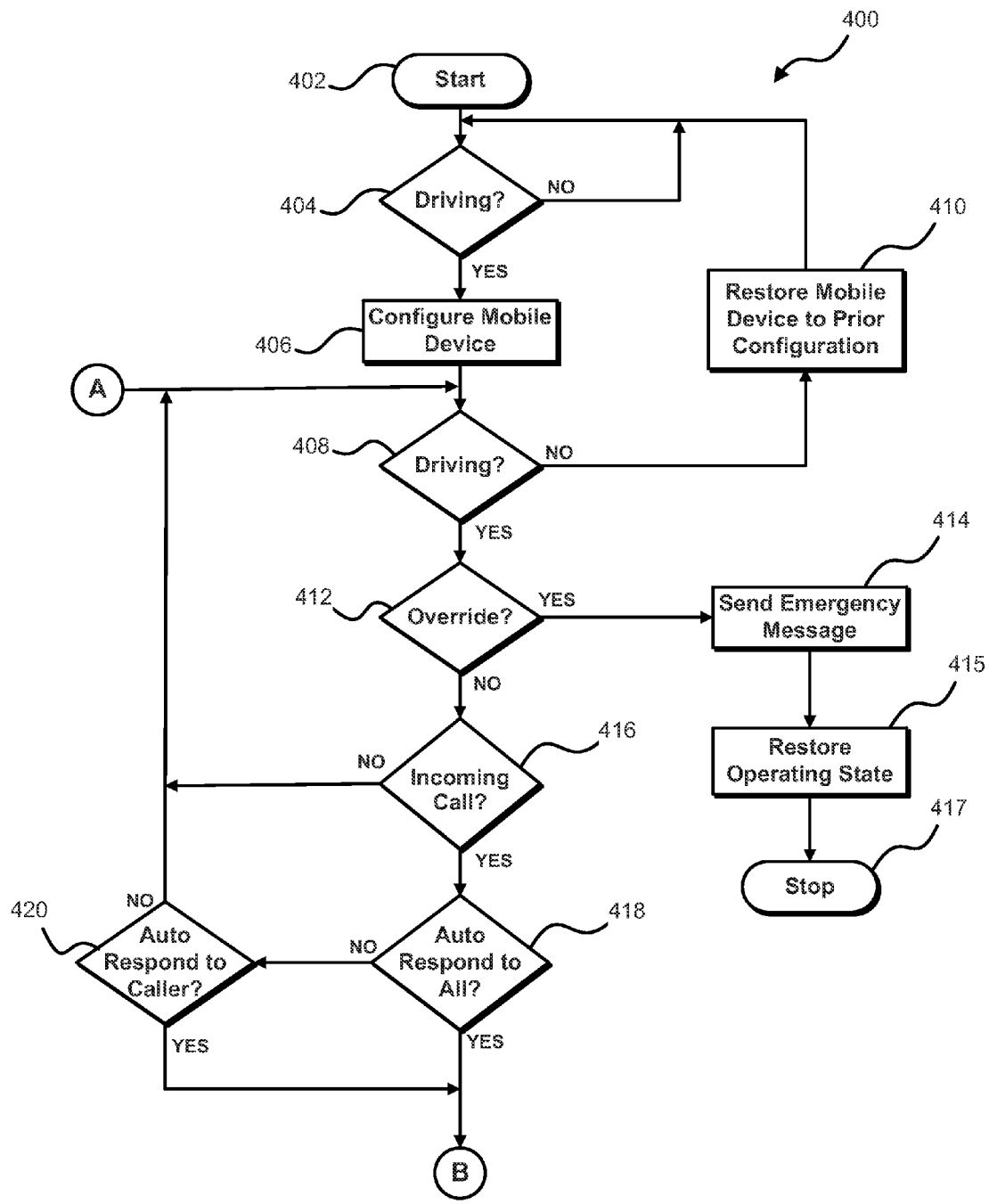
FIG. 4A is a flow diagram of part of the operation of an auto responder that is in accord with the invention.
Figure 4B:
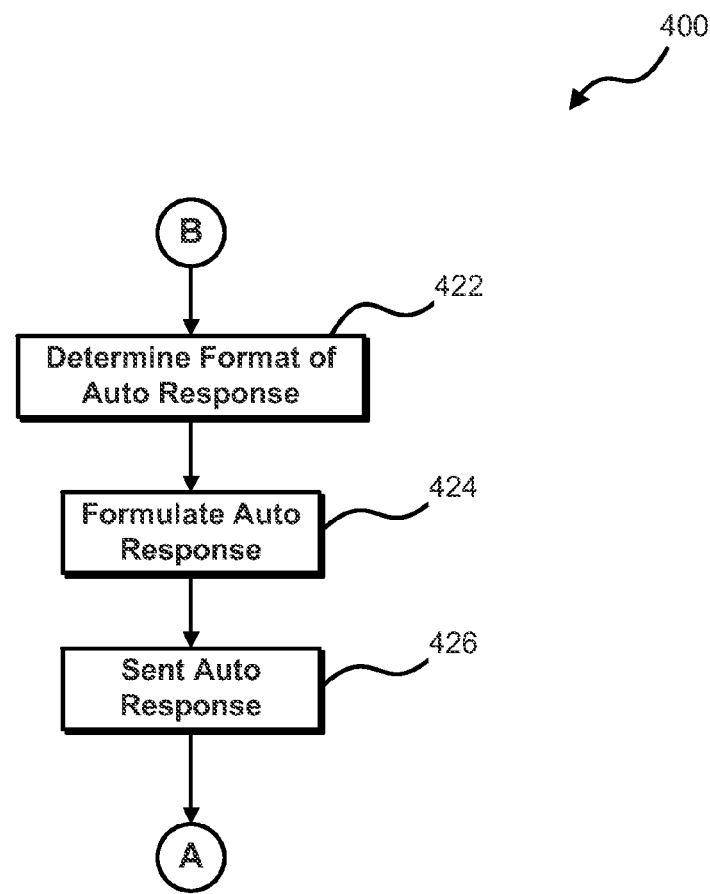
FIG. 4B is a flow diagram of another part of the operation shown in FIG. 4A.

FIGS. 4A and 4B present flow diagrams of the operation 400 of the auto responder app 118 when controlling the mobile device 116. As an overview, when the driver 112 is driving, the auto responder app 118 automatically detects that driving and prevents the mobile device 116 from informing the driver 112 of incoming calls while driving and prevents the driver from sending any non-emergency outgoing communication. The auto responder app 118 also determines whether to automatically respond to the particular caller 124, and, if so, prepares and sends an auto response to that caller 124. The auto response message can depend on the particular caller, on the time of day, on the user's location, on the user's speed, or on the user's acceleration, or on the user's compass heading. Furthermore, the auto respond message can be customized to include the user's location, speed, heading, and an estimated time of arrival. In addition, the auto respond message can be sent via voice, picture, SMS, email, Apple's iMessage™, another instant message service and/or any equivalent type of message.

The operation 400 starts 402 and proceeds with an automatic determination as to whether the driver 112 is driving, step 404. If the driver 112 is not driving the auto responder app 118 idles in a loop waiting for the driver 112 to start driving. During idling, the auto responder app 118 is transparent and does not interfere with other operations of the mobile device 116. However, the auto responder app 118 can be programmed during idling. For example, the auto responder app 118 can be configured to respond to all callers or to just select callers in the persistent storage 214. Additionally, response formats for auto response messages can be assigned (voice, visual, SMS, email, iMessage™, instant message), specific responses can be formatted for each select caller in the persistent storage 214, driving routes, such as the route 12 in FIG. 1, can be added to the persistent storage 214. The auto responder app 118 can be programmed to respond with different messages at different times, and auto responses can be configured to include the driver's location, speed, acceleration, heading, and estimated time of arrival.

When driving is detected in step 404 the operation 400 proceeds to automatically configure the mobile device 116 for auto responding, step 406. Auto configuration includes shutting off the ability of the driver 112 to make any outgoing calls (except emergency calls to selected numbers such as 911), texting, and data entry. Furthermore, all incoming message notifications to the driver 112 such as ring tones, vibrations, and display screen messages and actions (such as lighting up) are prevented. In addition, the operating state of the mobile device 116 before driving is saved and stored in the persistent storage 214.

After the mobile device is configured a determination is made as to whether the driver 112 is still driving, step 408. If not, the operation 400 proceeds to step 410 where the operating state of the mobile device 116 before driving started is recalled from the persistent storage 214 and restored. Then operation 400 proceeds back to step 404 where the auto responder app 118 waits for the driver 112 to start driving again.

However, if in step 408 the operation 400 detects that the driver 112 is still driving, a determination is made as to whether an override of the auto responder app 118 should be taken, step 412. In one case a driver 112 may seek to manually override the auto responder app 118. In another case the auto responder app 118 may detect an abnormal state, such as a probability of a collision, resulting from a sharp, high output from the accelerometer 122 or the mobile device 116 being out of an allowed area based on the location finder 128. If yes, a special emergency message is sent to a select party (such as a parent, co-worker, police department) or parties step 414, the saved operating state of the mobile device 116 is restored, step 415, and the operation 400 stops, step 417. The format, emergency message content, and select party are all preprogrammed (or defaults) and are stored in the persistent storage 214. After step 417 the driver 112 is free to make and send calls and messages in a normal fashion.

If there is no override, the operation 400 proceeds from step 412 to a determination as to whether there is an incoming call, step 416. If there is no incoming call the operation 400 returns to step 408 and a multi-step loop begins until the driver 112 stops driving, the driver 112 overrides the auto response app 118, or an incoming call is received.

If in step 416 an incoming call is received, the incoming caller's phone number is available via caller ID. A determination is then made as to whether the auto responder app 118 will respond to all callers, step 418. If the auto responder app 118 is set up to respond to only select callers the outcome of step 418 is NO, and the operation 400 proceeds by determining whether to respond to the caller, step 420. That determination involves attempting to find the caller in the persistent storage 214 using the incoming phone number. If the caller's phone number is not in the persistent storage 214 the determination in step 420 is NO and the operation 400 returns to step 408. But, if the caller's phone number is in the persistent storage 214 the determination is YES and an auto response is to be sent.

If an auto response is to be sent per step 418 or per step 420, the operation 400 proceeds to step 422 where a determination is made as to the format of the auto response. Formats include audio, video, SMS messages, iMessage™, instant messages, and/or email. The determination of which format to use can be preprogrammed and stored in the persistent storage 214, it can depend on who the incoming caller is (using caller ID), it can depend on the format of the incoming call, or an auto response in each format can be sent.

After the determination of the format of the auto response per step 422 the operation 400 proceeds to formulate one or more auto responses, step 424. It should be understood that the auto response app 118 is highly configurable and that different callers may be sent different auto responses, the auto responses may depend on the time of day, or on the driver's 112 location, speed, heading, or acceleration. Additionally, an auto response can be configured to include current information such as the driver's location, speed, heading, and estimated time of arrival. Details about step 422 are shown in more detail in the flow diagram of FIG. 5.

After the format of the auto response is determined per step 422, and after the auto response itself is formulated, the auto response is sent, step 426. Then the operation 400 returns to step 408 for continuing operations.

Figure 5:
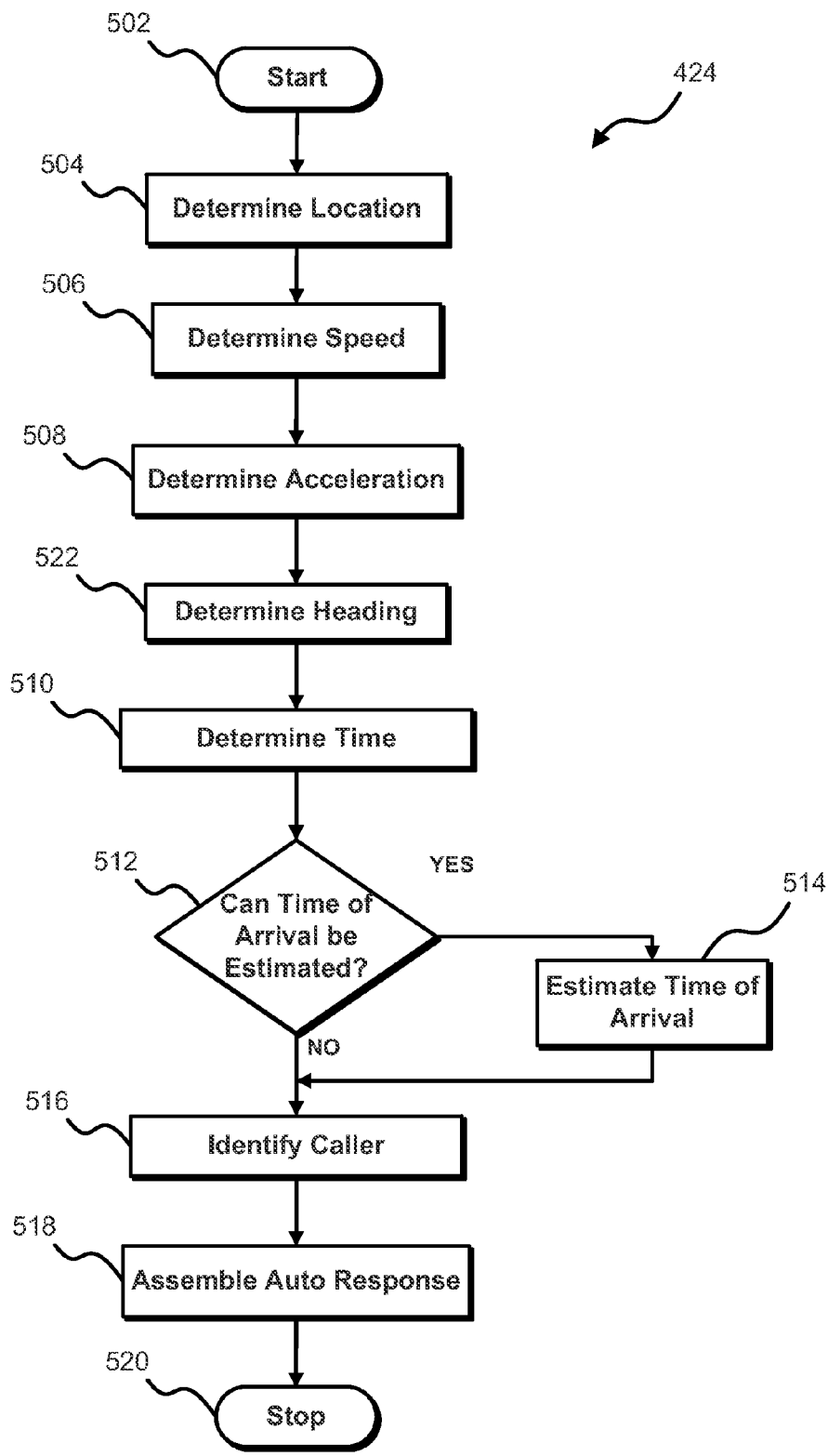
FIG. 5 is a flow diagram of the step of formulating an auto response in the operation shown in FIG. 4.

FIG. 5 provides operational details of step 424. It should be understood that how step 424 is performed depends on how the auto responder app 118 is setup. As noted, the auto responder app 118 is highly configurable and can be set up to provide the same response to all callers, different responses to different callers, auto responses that depend on the time of day, caller location, speed, heading, and acceleration, and can include an estimated time of arrival of the driver 112 at his destination. Also as previously noted, the estimated time of arrival depends on the route the driver 112, on historical travel times, as well as on the time of day. Because of the very large number of different permutations on formulating auto response messages, FIG. 5 should be understood as only illustrating features of the invention and not as limiting the scope of the invention.

Step 424 starts, step 502, and proceeds with determining the location of the driver 112, step 504. This involves having the auto responder app 118 interrogate the location finder 128 to find the location of the mobile device 116. Next, the auto responder app 118 determines the speed of the mobile device 116, step 506. Typically this will be performed by interrogating the location finder 128. After step 506 the auto responder app 118 determines the acceleration of the mobile device 116, step 508. This is performed by interrogating the accelerometer 122. Next, the auto responder app 118 determines the heading of the mobile device 116 using the compass 125, step 522. Then, at step 510 the time is determined by interrogating the clock 114.

The foregoing methods of determining location, speed, heading, and acceleration are example only. Such information may also be gleaned from cell tower signals or Wi-Fi signals. Additionally, acceleration and speed may also be estimated from GPS location fixes.

After step 510, a determination is then made as to whether an estimated time of arrival can be determined, step 512. To estimate the time of arrival, the destination and the route must be known. Those parameters must have been programmed or contained in the persistent storage 214. In addition, the location of the driver 112 determined in step 504 must correspond to a route in the persistent storage 214. Alternatively, the location of the driver 112 can be used to select a route from a list of routes and a destination. The distance between the driver 112 and the destination can be determined, either from the persistent storage 214, or by interrogating an external reference such as Google Maps™, MapQuest™ or other network accessible mapping data source.

If an estimated time of arrival can be determined, it is determined, step 514. That estimated time of arrival can be found from the current time (available from the clock 114), the distance to travel from step 512, and the speed, from step 506. However, a better estimate can be obtained using historical time travel information in the persistent storage 214. For example, the prior travel times to travel from the current location along the current route can be stored. An even better estimate is available if prior travel times to travel from the current location along the current route at the current time of day are stored. Compilation of historical information and its use are disclosed in U.S. patent application Ser. No. 13/350, 497 entitled "System and Method for Implementing Histogram Controlled Mobile Devices," filed on Jan. 13, 2012. However, other ways to compile and use historical information will be apparent to those skilled in the art.

In step 516, the auto responder app 118 identifies the caller. If the auto responder app 118 is configured to send the same auto response to all callers, step 516 need not be performed. However, since the invention is configurable to send different auto response messages to different callers, step 516 should be understood as enabling sufficient caller identification to enable assembly of a tailored message for the particular caller.

After step 516, the auto response message is assembled, step 518. As previously noted auto response messages may depend on the caller, which is available per step 516. Auto response messages may also depend on time, which is available per step 510. Auto response messages may also depend on the current location of the mobile device 116, which is available per step 504. Auto response messages may depend on the current acceleration, which is available per step 508. Auto response messages may depend on the current heading, which is available per step 522. Auto response messages may depend on the current speed, which is available per step 506. Auto response messages may include an estimated arrival time, which is available per step 514. Finally, the auto response message may depend on the type of incoming call. If an email is received one auto response can be sent, if an SMS message is received another auto response can be sent, if an iMessage™ is received another auto response can be sent, if an instant message is received another auto response can be sent, and if a voice call is received yet another auto response can be sent.

Assembly of the auto response message involves incorporating the components of the auto response message in accord with an arrangement stored in the persistent storage 214. For example, if during step 516 the caller 124 is identified as the parent of the driver 112 the persistent storage 214 has a stored arrangement consisting of the current location of the driver 112, the current speed of the driver 112, and an estimated time of arrival. In response, step 518 would arrange a message informing the caller 125 of the current location, speed, and estimated time of arrival. For other callers "canned" responses such as "Jim is currently driving and is unavailable," or "Robin is currently unavailable and will return your call as soon as possible," can be incorporated into the auto response message.

After assembly of the auto response message the process ends, step 520 and step 424 is complete.

While various embodiments of the invention have been described in detail above, the invention is not limited to the described embodiments, which should be considered as merely exemplary. Many modifications and extensions of the invention may be developed, and all such modifications are deemed to be within the scope of the invention defined by the appended claims.

What is claimed is:

1. A processor-implemented method for handling incoming communications at a mobile device, the method comprising:

receiving an incoming communication from a caller at the mobile device;

detecting at least one of location, speed, heading, and acceleration of the mobile device;

automatically detecting if the mobile device is in a moving vehicle;

automatically restricting use of the mobile device by blocking incoming message notifications and outgoing non-emergency messages when the mobile device is detected in a moving vehicle;

determining if use of the mobile device is restricted;

identifying the caller to determine a caller identity;

determining a destination based on predetermined route information and the at least one of the location, speed, heading and acceleration of the mobile device;

determining an estimated time of arrival at the determined destination; and automatically transmitting from the mobile device a response message with an indication of the estimated time of arrival at the determined destination responsive to determining if use of the mobile device is restricted and responsive to the caller identity.

2. The processor-implemented method of claim 1, further comprising:
restricting use of the mobile device based on the detected at least one of location, speed, heading and acceleration of the mobile device.

3. The processor-implemented method of claim 2, wherein restricting use of the mobile device further comprises at least one of locking a user interface of the mobile device, preventing receipt of phone calls, preventing sending of non-emergency messages, and preventing receipt of electronic messages.

4. The processor-implemented method of claim 2, further comprising detecting the at least one of location, speed, heading, and acceleration of the mobile device responsive to the incoming communication.

5. The processor-implemented method of claim 1, further comprising:
transmitting the response message with an indication of the at least one of the location, the speed, the heading, and the acceleration of the mobile device.

6. The processor-implemented method of claim 1, further comprising:
comparing the caller identity with a predetermined identity list; and
automatically transmitting the response message responsive to the caller identity corresponding to an identity in the identity list.

7. The processor-implemented method of claim 1, wherein content of the response message is dependent on the caller identity.

8. A processor-implemented method for handling incoming communications at a mobile device, the method comprising:
receiving an incoming communication from a caller at the mobile device;
automatically detecting if the mobile device is in a moving vehicle;
automatically restricting use of the mobile device by blocking incoming message notifications and outgoing non-emergency messages when the mobile device is detected in a moving vehicle;
determining if use of the mobile device is restricted;
detecting at least one of location, speed, heading, and acceleration of the mobile device;
determining a destination based on predetermined route information and the at least one of the location, speed, heading, and acceleration of the mobile device;
determining an estimated time of arrival at the determined destination; and
automatically transmitting a response message to the caller responsive to determining use of the mobile device is restricted, wherein the response message comprises an indication of the estimated time of arrival at the determined destination.

9. A communication network, comprising:
a mobile device having a processor, persistent memory for storing information, a data port for receiving incoming calls and for sending messages, a location finder for determining the current location of the mobile device, at least one input/output ("I/O") element for producing a human detectable output, and a clock for determining time, wherein the memory, data port, location finder, I/O element, and clock are operatively connected to the processor; and
application software controlling the processor;
wherein the application software controls the processor to detect at least one of location, speed, heading, and acceleration of the mobile device to, and to determine if the mobile device is moving, and to determine a destination based on predetermined route information and the at least one of the location, speed, heading, and acceleration of the mobile device, and to determine an estimated time of arrival at the determined destination;
wherein if the processor determines that the mobile device is moving the application software controls the processor to automatically stop the I/O element from producing human detectable output and to prevent outgoing non-emergency communications;
wherein if the mobile device is moving and the data port receives an incoming call from a caller the application software controls the processor to identify the caller;
wherein the application software controls the processor to automatically formulate a response message that depends on the identity of the caller, the response message comprising an indication of the estimated time of arrival at the determined destination; and
wherein the application software controls the processor to automatically cause the data port to send the response message.

10. The communication network according to claim 9, wherein if the processor cannot determine the identity of the caller a response message is not sent.

11. The communication network according to claim 9, wherein the response message is at least one of an audio message, a short message service ("SMS") message, a visual message, an email message, an iMessage, and an instant message.

12. The communication network according to claim 9, wherein the mobile device includes a compass sensor and the response message includes a compass heading.

13. The communication network according to claim 9, wherein the mobile device is prevented from sending out a user initiated signal when the mobile device is moving.

14. The communication network according to claim 9, wherein the response message comprises the location of the mobile device.

15. The communication network according to claim 9, wherein the response message comprises the speed of the mobile device.

16. The communication network according to claim 9, wherein the response message comprises the acceleration of the mobile device.

17. The communication network according to claim 9, wherein the response message depends on the time of day.

18. The communication network according to claim 9, wherein the estimated time of arrival depends on a route stored in the persistent memory.

19. The communication network according to claim 18, wherein the estimated time of arrival depends on the current location of the mobile device.

20. The communication network according to claim 9, wherein the identity of the caller is determined from information stored in the persistent memory.

21. A communication network, comprising:
a mobile device having a processor, memory for storing information, a data port for receiving incoming calls and for sending messages, a location finder for determining the location of the mobile device, at least one I/O element for producing a human detectable output, and a clock for determining time, where the memory, data port, location finder, I/O element, and clock are operatively connected to the processor; and application software controlling the processor;
wherein the application software controls the processor to detect at least one of location, speed, heading, and acceleration of the mobile device, and to determine if the mobile device is moving, and to determine a destination and an estimated time of arrival at the destination based on predetermined route information and the at least one of the location, speed, heading, and acceleration of the mobile device;
wherein if the processor determines that the mobile device is moving the application software controls the processor to automatically stop the I/O element from producing the human detectable output and to prevent outgoing non-emergency communications;
wherein if the mobile device is moving when the data port receives an incoming call from a caller the application software controls the processor to determine the current location of the mobile device;
wherein the application software controls the processor to automatically formulate an automatic response message that depends on the current location of the mobile device, the response message comprising an indication of the estimated time of arrival at the determined destination; and
wherein the application software controls the processor to cause the data port to automatically send the response message.

22. The communication network according to claim 21, wherein the response message is at least one of an audio message, a visual message, a short message service ("SMS") message, an iMessage, an instant message, and an email message.

23. The communication network according to claim 21, wherein the application software controls the processor to determine when an abnormal condition occurs, and wherein when an abnormal condition occurs the response message is an emergency message.

24. The communication network according to claim 21, wherein the abnormal condition is a collision.

25. The communication network according to claim 21, wherein the response message comprises at least one of the location, the speed and the acceleration of the mobile device.

26. The communication network according to claim 21, wherein the response message depends on the time of day.

27. The communication network according to claim 21, wherein the estimated time of arrival depends on a route stored in the memory.

28. A communication network, comprising:
a mobile device having a processor, memory storing data related to a route to a destination, a data port for receiving incoming calls and for sending messages, a location finder for determining the location of the mobile device, at least one I/O element for producing a human detectable output, and a clock for determining time, wherein the memory, data port, location finder, I/O element, and clock are operatively connected to the processor; and
application software controlling the processor;
wherein the application software controls the processor to detect at least one of location, speed, heading, and acceleration of the mobile device and to determine if the mobile device is moving;
wherein the application software automatically prevents the user from sending a message when the mobile device is moving;
wherein if the mobile device is moving when the data port receives an incoming call the application software controls the processor to determine the current location of the mobile device and to determine the destination based on the data related to the route and the at least one of the location, speed, heading, and acceleration of the mobile device;
wherein if the current location of the mobile device is on the route the application software controls the processor to recall route information;
wherein the application software controls the processor to determine the speed of the mobile device;
wherein the application software controls the processor to produce an estimated time of arrival of the mobile device at the destination over the route from the current location;
wherein the application software controls the processor to automatically formulate a response message that includes the estimated time of arrival; and
wherein the application software controls the processor to automatically cause the data port to send the response message.

29. The communication network according to claim 28, wherein if the mobile device is moving the application software controls the processor to automatically stop the I/O element from producing the human detectable output.

30. The communication network according to claim 28, wherein the response message is at least one of an audio message, a text message, and an email message.

31. The communication network according to claim 28, wherein the response comprises the location of the mobile device.

32. The communication network according to claim 28, wherein the response message comprises at least one of the speed, heading, and acceleration of the mobile device.

33. The communication network according to claim 28, wherein the response message depends on the time of day.

34. A non-transitory computer readable storage media containing coded instructions to:
implement a positioning system to produce location information;
implement a motion system to detect at least one of location, speed, heading, and acceleration to detect motion of a mobile device;
implement an I/O element to produce human detectable output;
implement a data port to receive incoming calls and send messages;
implement a memory to store location information;
automatically prevent the I/O element from producing human detectable output based on the detected motion;
automatically prevent outgoing non-emergency communications;
determine the current location of the mobile device;
determine a destination and an estimated time of arrival at the destination based on predetermined route information and the at least one of the location, speed, heading, and acceleration of the mobile device;
formulate an automatic response message comprising an indication of the estimated time of arrival at the determined destination based on the current location; and
automatically send the automatic response message from the data port.

35. A non-transitory computer readable storage media containing coded instructions to:
implement a positioning system to produce location information;
implement a motion system to detect at least one of location, speed, heading, and acceleration to detect motion of a mobile device;

implement an I/O element to produce human detectable output;
implement a data port to receive incoming calls and send messages;
implement a memory to store caller identification information;
automatically prevent the I/O element from producing human detectable output based on the detected motion;
automatically prevent outgoing non-emergency communications based on the detected motion;
determine a destination and an estimated time of arrival at the destination based on predetermined route information and the at least one of the location, speed, heading, and acceleration of the mobile device;
identify the caller when the data port receives an incoming call;
formulate an automatic response message comprising an indication of the estimated time of arrival at the determined destination based on the identity of the caller; and
automatically send the automatic response message from the data port.

\* \* \* \* \*